(12) United States Patent
Yamazaki et al.

(10) Patent No.: US 12,362,381 B2
(45) Date of Patent: *Jul. 15, 2025

(54) SECONDARY BATTERY AND A METHOD FOR FABRICATING THE SAME

(71) Applicant: SEMICONDUCTOR ENERGY LABORATORY CO., LTD., Atsugi (JP)

(72) Inventors: Shunpei Yamazaki, Tokyo (JP); Minoru Takahashi, Nagano (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/594,506

(22) Filed: Mar. 4, 2024

(65) Prior Publication Data

US 2024/0266592 A1 Aug. 8, 2024

Related U.S. Application Data

(60) Continuation of application No. 18/114,389, filed on Feb. 27, 2023, now Pat. No. 11,923,499, which is a
(Continued)

(30) Foreign Application Priority Data

Apr. 19, 2013 (JP) ................... 2013-088165

(51) Int. Cl.
*H01M 4/13* (2010.01)
*H01M 4/04* (2006.01)
(Continued)

(52) U.S. Cl.
CPC ..... *H01M 10/0525* (2013.01); *H01M 4/0404* (2013.01); *H01M 4/0426* (2013.01);
(Continued)

(58) Field of Classification Search
CPC .......... H01M 10/0525; H01M 10/058; H01M 4/0404; H01M 4/0426; H01M 4/13;
(Continued)

(56) References Cited

U.S. PATENT DOCUMENTS

| 4,611,034 A | 9/1986 | Meyer et al. |
| 5,338,625 A | 8/1994 | Bates et al. |

(Continued)

FOREIGN PATENT DOCUMENTS

| CN | 101180753 A | 5/2008 |
| CN | 103155236 A | 6/2013 |

(Continued)

OTHER PUBLICATIONS

Ogumi.Z et al., "6.1.6 Influence of Electrolytic Solution and Surface Film Formation", Lithium secondary battery, Mar. 20, 2008, pp. 116-124, OHMSHA.

(Continued)

*Primary Examiner* — James Lee
(74) *Attorney, Agent, or Firm* — NIXON PEABODY LLP; Jeffrey L Costellia

(57) ABSTRACT

The adhesion between metal foil serving as a current collector and a negative electrode active material is increased to enable long-term reliability. An electrode active material layer (including a negative electrode active material or a positive electrode active material) is formed over a base, a metal film is formed over the electrode active material layer by sputtering, and then the base and the electrode active material layer are separated at the interface therebetween; thus, an electrode is formed. The electrode active material particles in contact with the metal film are bonded by being covered with the metal film formed by the sputtering. The electrode active material is used for at least one of a pair of
(Continued)

electrodes (a negative electrode or a positive electrode) in a lithium-ion secondary battery.

9 Claims, 11 Drawing Sheets

Related U.S. Application Data division of application No. 17/315,766, filed on May 10, 2021, now Pat. No. 11,594,752, which is a continuation of application No. 15/697,585, filed on Sep. 7, 2017, now Pat. No. 11,005,123, which is a division of application No. 14/245,037, filed on Apr. 4, 2014, now Pat. No. 9,768,467.

(51) Int. Cl.
  *H01M 4/139* (2010.01)
  *H01M 4/36* (2006.01)
  *H01M 4/62* (2006.01)
  *H01M 10/0525* (2010.01)
  *H01M 10/058* (2010.01)

(52) U.S. Cl.
  CPC ............ *H01M 4/13* (2013.01); *H01M 4/139* (2013.01); *H01M 4/366* (2013.01); *H01M 4/621* (2013.01); *H01M 10/058* (2013.01); *H01M 2220/30* (2013.01); *Y10T 29/49108* (2015.01); *Y10T 29/49115* (2015.01)

(58) Field of Classification Search
  CPC ...... H01M 4/139; H01M 4/366; H01M 4/621; H01M 2220/30; Y10T 29/49108; Y10T 29/49115
  See application file for complete search history.

(56) References Cited

U.S. PATENT DOCUMENTS

| | | | |
|---|---|---|---|
| 5,650,243 A | 7/1997 | Ferment | |
| 5,989,943 A | 11/1999 | Whitten et al. | |
| 6,030,909 A | 2/2000 | Fu | |
| 6,086,699 A | 7/2000 | Nakashima et al. | |
| 6,218,050 B1 | 4/2001 | Yoon et al. | |
| 7,068,254 B2 | 6/2006 | Yamazaki et al. | |
| 7,147,971 B2 | 12/2006 | Okamoto et al. | |
| 7,235,330 B1 | 6/2007 | Fujimoto et al. | |
| 7,365,750 B2 | 4/2008 | Yamazaki et al. | |
| 7,402,829 B2 | 7/2008 | Green | |
| 7,432,010 B2 | 10/2008 | Dokko | |
| 7,432,014 B2 | 10/2008 | Konishiike et al. | |
| 7,459,233 B2 | 12/2008 | Konishiike et al. | |
| 7,521,151 B2 | 4/2009 | Hwang et al. | |
| 7,592,099 B2 | 9/2009 | Tamura et al. | |
| 7,625,668 B2 | 12/2009 | Konishiike et al. | |
| 8,367,440 B2 | 2/2013 | Takayama et al. | |
| 8,415,208 B2 | 4/2013 | Takayama et al. | |
| 8,455,044 B2 | 6/2013 | Yokoi et al. | |
| 8,530,892 B2 | 9/2013 | Yamazaki et al. | |
| 9,343,241 B2 | 5/2016 | Momo et al. | |
| 9,673,481 B2 | 6/2017 | Sabi et al. | |
| 9,768,467 B2 | 9/2017 | Yamazaki et al. | |
| 10,403,927 B2 | 9/2019 | Sabi et al. | |
| 2002/0090537 A1 | 7/2002 | Sano et al. | |
| 2002/0122985 A1 | 9/2002 | Sato et al. | |
| 2004/0096745 A1 | 5/2004 | Shibano et al. | |
| 2004/0234850 A1 | 11/2004 | Watarai et al. | |
| 2005/0153208 A1 | 7/2005 | Konishiike et al. | |
| 2005/0256251 A1 | 11/2005 | Amano et al. | |
| 2007/0048619 A1 | 3/2007 | Inda | |
| 2007/0059584 A1 | 3/2007 | Nakano et al. | |
| 2007/0087269 A1 | 4/2007 | Inda | |
| 2007/0231704 A1 | 10/2007 | Inda | |
| 2008/0241665 A1 | 10/2008 | Sano | |
| 2008/0297981 A1 | 12/2008 | Endo et al. | |
| 2008/0311480 A1 | 12/2008 | Sano | |
| 2009/0017380 A1 | 1/2009 | Honda et al. | |
| 2009/0202915 A1 | 8/2009 | Modeki et al. | |
| 2009/0226821 A1 | 9/2009 | Ihara et al. | |
| 2010/0075225 A1 | 3/2010 | Wilkins et al. | |
| 2010/0124707 A1 | 5/2010 | Hirose et al. | |
| 2010/0239907 A1 | 9/2010 | Izumi | |
| 2010/0319188 A1 | 12/2010 | Yamazaki et al. | |
| 2011/0117417 A1 | 5/2011 | Pitts | |
| 2011/0177396 A1 | 7/2011 | Moriwaka et al. | |
| 2011/0212363 A1 | 9/2011 | Yamazaki et al. | |
| 2011/0229750 A1* | 9/2011 | McLellan | H01M 50/491 425/464 |
| 2011/0236757 A1 | 9/2011 | Yukawa et al. | |
| 2011/0289767 A1 | 12/2011 | Yamazaki | |
| 2011/0291240 A1 | 12/2011 | Yamazaki | |
| 2011/0292564 A1 | 12/2011 | Yamazaki | |
| 2011/0294005 A1 | 12/2011 | Kuriki et al. | |
| 2011/0294011 A1 | 12/2011 | Kuriki et al. | |
| 2011/0300445 A1 | 12/2011 | Murakami et al. | |
| 2011/0305950 A1 | 12/2011 | Kuriki et al. | |
| 2012/0003383 A1 | 1/2012 | Furuno | |
| 2012/0003530 A1 | 1/2012 | Kuriki et al. | |
| 2012/0003807 A1 | 1/2012 | Furuno et al. | |
| 2012/0015247 A1 | 1/2012 | Yoshida | |
| 2012/0045692 A1 | 2/2012 | Takemura et al. | |
| 2012/0070738 A1 | 3/2012 | Yoshida | |
| 2012/0088151 A1 | 4/2012 | Yamazaki et al. | |
| 2012/0141866 A1 | 6/2012 | Kuriki et al. | |
| 2012/0156556 A1 | 6/2012 | Kuriki et al. | |
| 2012/0328956 A1 | 12/2012 | Oguni et al. | |
| 2013/0052528 A1 | 2/2013 | Kuriki et al. | |
| 2013/0076612 A1 | 3/2013 | Myers | |
| 2013/0214324 A1 | 8/2013 | Takayama et al. | |
| 2013/0252089 A1 | 9/2013 | Kuriki | |
| 2013/0266858 A1 | 10/2013 | Inoue et al. | |
| 2013/0273405 A1 | 10/2013 | Takahashi et al. | |
| 2013/0323585 A1 | 12/2013 | Inoue et al. | |
| 2014/0099554 A1 | 4/2014 | Inoue et al. | |
| 2014/0127566 A1 | 5/2014 | Kuriki et al. | |
| 2014/0127567 A1 | 5/2014 | Kuriki et al. | |
| 2014/0370184 A1 | 12/2014 | Takemura et al. | |
| 2016/0233031 A1 | 8/2016 | Momo et al. | |

FOREIGN PATENT DOCUMENTS

| | | |
|---|---|---|
| EP | 0878245 A | 11/1998 |
| EP | 1154383 A | 11/2001 |
| EP | 1595929 A | 11/2005 |
| EP | 1873846 A | 1/2008 |
| EP | 2395590 A | 12/2011 |
| JP | 10-284130 A | 10/1998 |
| JP | 10-321617 A | 12/1998 |
| JP | 11-096993 A | 4/1999 |
| JP | 11-144709 A | 5/1999 |
| JP | 11-233100 A | 8/1999 |
| JP | 11-273680 A | 10/1999 |
| JP | 2000-013309 A | 1/2000 |
| JP | 2000-090923 A | 3/2000 |
| JP | 2000-251852 A | 9/2000 |
| JP | 2000-252175 A | 9/2000 |
| JP | 2002-033823 A | 1/2002 |
| JP | 2002-042863 A | 2/2002 |
| JP | 2003-263987 A | 9/2003 |
| JP | 2004-014381 A | 1/2004 |
| JP | 2004-031316 A | 1/2004 |
| JP | 2004-158222 A | 6/2004 |
| JP | 2004-183078 A | 7/2004 |
| JP | 2004-234987 A | 8/2004 |
| JP | 2005-108638 A | 4/2005 |
| JP | 2005-197080 A | 7/2005 |
| JP | 2005-197096 A | 7/2005 |
| JP | 2005-302510 A | 10/2005 |
| JP | 2005-332769 A | 12/2005 |
| JP | 2005-340078 A | 12/2005 |
| JP | 2006-100244 A | 4/2006 |
| JP | 2006-156284 A | 6/2006 |

(56) References Cited

FOREIGN PATENT DOCUMENTS

| | | |
|---|---|---|
| JP | 2006-293000 A | 10/2006 |
| JP | 2007-059409 A | 3/2007 |
| JP | 2007-123081 A | 5/2007 |
| JP | 2007-220377 A | 8/2007 |
| JP | 2007-299580 A | 11/2007 |
| JP | 2007-324079 A | 12/2007 |
| JP | 2008-131616 A | 6/2008 |
| JP | 2008-171599 A | 7/2008 |
| JP | 2008-198492 A | 8/2008 |
| JP | 2008-207526 A | 9/2008 |
| JP | 2009-087891 A | 4/2009 |
| JP | 2009-117165 A | 5/2009 |
| JP | 2009-181879 A | 8/2009 |
| JP | 2009-301727 A | 12/2009 |
| JP | 2010-010094 A | 1/2010 |
| JP | 2010-189656 A | 9/2010 |
| JP | 2010-244847 A | 10/2010 |
| JP | 2011-119693 A | 6/2011 |
| JP | 2012-064571 A | 3/2012 |
| JP | 2012-074166 A | 4/2012 |
| JP | 2012-099468 A | 5/2012 |
| JP | 2012-195249 A | 10/2012 |
| JP | 2013-028526 A | 2/2013 |
| JP | 2013-065837 A | 4/2013 |
| JP | 2014-225445 A | 12/2014 |
| KR | 2008-0009269 A | 1/2008 |
| KR | 2011-0111426 A | 10/2011 |
| TW | 200529486 | 9/2005 |
| TW | 201230477 | 7/2012 |
| WO | WO-2006/054779 | 5/2006 |
| WO | WO-2006/100837 | 9/2006 |
| WO | WO-2011/055668 | 5/2011 |
| WO | WO-2012/023464 | 2/2012 |
| WO | WO-2012/046669 | 4/2012 |
| WO | WO-2012/049967 | 4/2012 |
| WO | WO-2013/031526 | 3/2013 |
| WO | WO-2014/171337 | 10/2014 |

OTHER PUBLICATIONS

Inoue.N et al., "Improvement of cycle performance of lithium ion batteries at elevated temperature of 60°C using graphite coated with metal oxide", 222nd ECS Meeting Abstract, Oct. 7, 2012, p. 654, ECS.
International Search Report (Application No. PCT/JP2014/059791) Dated Jun. 10, 2014.
Written Opinion (Application No. PCT/JP2014/059791) Dated Jun. 10, 2014.
Su.L et al., "Core double-shell Si@SiO2@C nanocomposites as anode materials for Li-ion batteries", Chemical Communications , Feb. 5, 2010, vol. 46, No. 16, pp. 2590-2592.
Taiwanese Office Action (Application No. 103113008) Dated Oct. 24, 2017.
Yang.S et al., "Graphene-Based Nanosheets with a Sandwich Structure", Angew. Chem. Int. Ed. (Angewandte Chemie International Edition) Supporting Information, Jun. 21, 2010, vol. 49, No. 28, pp. 4795-4799.

* cited by examiner in case of Charge

SECONDARY BATTERY AND A METHOD FOR FABRICATING THE SAME

TECHNICAL FIELD

The present invention relates to a structure of a secondary battery and a method for fabricating the secondary battery. In particular, the present invention relates to an electrode of a lithium-ion secondary battery.

BACKGROUND ART

Examples of the secondary battery include a nickel-metal hydride battery, a lead-acid battery, and a lithium-ion secondary battery.

Such secondary batteries are used as power sources in portable information terminals typified by mobile phones. In particular, lithium-ion secondary batteries have been actively researched and developed because capacity thereof can be increased and size thereof can be reduced.

Patent Document 1 discloses that a multilayer graphene flake or multilayer graphene flakes are wrapped around positive electrode active material particles or negative electrode active material particles to prevent dispersion of the positive electrode active material particles or the negative electrode active material particles and collapse of a positive electrode active material layer or a negative electrode active material layer. Multilayer graphene can maintain the bond to the positive electrode active material particles or the negative electrode active material particles.

REFERENCE

Patent Document

[Patent Document 1] Japanese Published Patent Application No. 2013-028526

DISCLOSURE OF INVENTION

In a lithium-ion secondary battery, a carbon material is typically used as a negative electrode active material, and lithium metal complex oxide is typically used as a positive electrode active material.

When an electrode layer is formed over a current collector such as metal foil, slurry in which fine particles of a positive electrode active material or a negative electrode active material are suspended in a solvent (suspension containing a binder and the like) is applied onto the metal foil and dried. For example, in the case of forming a negative electrode, a solution containing carbon particles is applied onto copper foil or aluminum foil and dried; moreover, this is pressed if necessary. The negative electrode formed in such a manner, a separator, a positive electrode containing a positive electrode active material such as lithium iron phosphate, and an electrolytic solution are assembled to fabricate a lithium-ion secondary battery.

The type of deterioration of the lithium-ion secondary battery can be broadly classified as and expressed by the terms "calendar life" and "cycle life". The term "calendar life" is used to express deterioration due to an electrochemical change caused by charging a lithium-ion secondary battery at high temperature even after the lithium-ion secondary battery is fully charged. The term "cycle life" is used to express deterioration due to an electrochemical change or a physical change of a lithium-ion secondary battery caused by repeating charge and discharge.

There are some factors that influence the deterioration expressed by the terms "cycle life" and "calendar life".

For example, a factor that influences the deterioration is a binder. Typically, an organic material such as polyvinylidene fluoride is used as the binder. The adhesion of metal foil such as copper foil or aluminum foil (a base) to polyvinylidene fluoride (the binder) is not sufficient at the interface between the metal foil and the binder. When used by itself, the binder is a cause of the internal resistance of a battery. Therefore, the used amount of the binder is preferably small.

Another factor that influences the deterioration is carbon particles. Surfaces of the carbon particles are extremely water repellent. An area of contact between metal foil and the carbon particles is small, which indicates that the metal foil and the carbon particles are in point contact with each other; therefore, it is difficult to ensure sufficient adhesion. Furthermore, it is known that the carbon particle has an approximately 10% volume change by intercalation and deintercalation of lithium, and stress is generated at the interface between a current collector and the carbon particles that are active material particles. For these reasons, when a lithium-ion secondary battery is charged and discharged repeatedly, the adhesion of the metal foil to the negative electrode active material is decreased, so that the negative electrode active material is separated from the metal foil, decreasing charge and discharge characteristics or shortening the life of the lithium-ion secondary battery.

One object is to increase the adhesion between metal foil serving as a current collector and a negative electrode active material in a lithium-ion secondary battery to ensure long-term reliability.

Another object is to provide a novel structure of an electrode in a lithium-ion secondary battery. Another object is to provide a flexible secondary battery.

An electrode active material layer (including a negative electrode active material or a positive electrode active material) is formed over a base, a metal film is formed over the electrode active material layer by sputtering among other methods, and then the base and the electrode active material layer are separated at the interface therebetween; thus, an electrode is formed. The electrode active material particles in contact with the metal film are bonded by being covered with the metal film formed, for example, by the sputtering; the electrode active material layer is used for at least one of a pair of electrodes (a negative electrode or a positive electrode) in the lithium-ion secondary battery.

One embodiment of the invention disclosed in this specification is a method for fabricating a secondary battery including the steps of applying slurry containing electrode active material particles onto a base and drying the slurry, forming a metal film by sputtering among other methods to bond the electrode active material particles with each other or strengthen the bond between the electrode active material particles, and separating the base and the electrode active material particles from each other at the interface therebetween, thereby forming an electrode including the electrode active material particles that are partly bonded with each other with the metal film.

The lithium-ion secondary battery fabricated in such a manner has a novel structure. The structure of the secondary battery includes a first electrode that includes a plurality of electrode active material particles and a metal film that bonds the electrode active material particles adjacent to each other, a second electrode, and an electrolytic solution at least between the first electrode and the second electrode.

In addition, the metal film is not limited to a metal film that bonds adjacent particles in the two-dimensional direction. The metal film may extend into the space between the adjacent particles, and bond the adjacent particles in the film thickness direction. In this structure, a secondary battery includes a pair of electrodes and an electrolytic solution provided therebetween. At least one of the pair of electrodes includes electrode active material particles and a metal film that fills at least part of a space between the electrode active material particles. The metal film that partly fills the space bonds the electrode active material particles with each other or strengthens the bond between the electrode active material particles.

In the case of using carbon particles as a negative electrode active material, for example, the carbon particles are provided on a surface of a flat base, and a space is provided between the carbon particles. A metal film is formed by sputtering to fill at least part of the space between the carbon particles. When a layer containing carbon particles is referred to as a negative electrode active material layer, a plurality of projections and a plurality of depressions are provided on a surface of the negative electrode active material layer. In this case, a metal film is formed by sputtering to fill the plurality of depressions on the surface of the negative electrode active material layer or to planarize the plurality of projections on the surface of the negative electrode active material layer.

The metal film formed by sputtering maintains the bond between the negative electrode active material particles that are in contact with the metal film. When copper is used as the material of the metal film, the metal film serves as a current collector.

Also in the case where a positive electrode has active material particles, a metal film is formed by sputtering to fill at least part of a space between positive electrode active material particles. The formed metal film maintains the bond between the positive electrode active material particles that are in contact with the metal film. When copper is used as the material of the metal film, the metal film serves as a current collector.

Furthermore, if necessary, a current collector is fixed to and electrically connected to the metal film, whereby the current collector and the metal film can be in surface contact with each other, resulting in an increase in the adhesion therebetween. In the case of providing the current collector in contact with the metal film, the metal film serves as a buffer layer between the current collector and the negative electrode active material (or the positive electrode active material).

A method for fabricating a secondary battery in the case of fixing a current collector to a metal film is as follows. Slurry containing electrode active material particles is applied onto a base and dried, a metal film is formed by sputtering to bond the electrode active material particles with each other or strengthen the bond between the electrode active material particles, the base and the electrode active material particles are separated from each other at the interface therebetween, and the current collector is electrically connected to the metal film, thereby forming an electrode. By strengthening the bond between the electrode active material particles, the adhesion between the current collector and the electrode active material particles can be kept even when the current collector and the electrode active material are bent. Consequently, a flexible secondary battery can be provided.

The flexible secondary battery can have a curved surface with a curvature radius of greater than or equal to 10 mm and less than or equal to 150 mm.

Description is given of the radius of curvature of a surface with reference to FIGS. 11A to 11C. In FIG. 11A, in a plane surface 1701 along which a curved surface 1700 is cut, part of a curve 1702 is approximate to an arc of a circle, and the radius of the circle is denoted by a radius 1703 of curvature and the center of the circle is denoted by a center 1704 of curvature. FIG. 11B is a top view of the curved surface 1700. FIG. 11C is a cross-sectional view of the curved surface 1700 taken along the plane surface 1701. When a curved surface is cut along a plane surface, the radius of curvature of a curve depends on along which plane surface the curved surface is cut. Here, the radius of curvature of the surface is defined as the radius of curvature of a curve which is cut along a plane surface to have a curve with the smallest radius of curvature.

In the case of curving a secondary battery in which a component 1805 including electrodes and an electrolytic solution is sandwiched between two films as exterior bodies, a radius 1802 of curvature of a film 1801 close to a center 1800 of curvature of the secondary battery is smaller than a radius 1804 of curvature of a film 1803 far from the center 1800 of curvature (FIG. 10A). When the secondary battery is curved and has an arc-shaped cross section, compressive stress is applied to a surface of the film close to the center 1800 of curvature and tensile stress is applied to a surface of the film far from the center 1800 of curvature (FIG. 10B). However, by forming a pattern of projections and depressions on surfaces of the exterior bodies, influence of distortion can be reduced to be acceptable even when the compressive stress and the tensile stress are applied. For this reason, the secondary battery can be deformed as long as the exterior body close to the center of curvature has a curvature radius of greater than or equal to 10 mm, preferably greater than or equal to 30 mm.

Note that the cross-sectional shape of the secondary battery is not limited to a simple arc shape, and the cross section can be partially arc-shaped; for example, a shape illustrated in FIG. 10C, a wavy shape illustrated in FIG. 10D, and an S shape can be used. When the curved surface of the secondary battery has a shape with a plurality of centers of curvature, the secondary battery can be deformed as long as a surface of the exterior body close to the center of curvature has a curvature radius of greater than or equal to 10 mm, preferably greater than or equal to 30 mm in a curved surface having the smallest radius of curvature among the radiuses of curvature of the centers.

As a material of the base, a material which can withstand sputtering for forming the metal film can be used; in addition, the material hardly reacts with a solvent containing the negative electrode active material. For example, a plastic film or metal foil (e.g., titanium foil and copper foil) can be used. Furthermore, to separate the electrode active material particles from the base easily in the later step, a silicon oxide film or a fluororesin film (e.g., a polytetrafluoroethylene film) may be provided on a surface of the plastic film or a surface of the metal foil. The metal film can be formed by a known method, e.g., sputtering, evaporation, and chemical vapor deposition.

As the negative electrode active material, carbon particles are typically used; for example, natural graphite (e.g., scale-like and spherical) and artificial graphite can be used. Note that carbon particles whose surfaces are partly covered with a silicon oxide film may be used as the negative electrode active material, for example.

In this specification, there is no particular limitation on the negative electrode active material as long as lithium ions can electrochemically occluded into and released from the negative electrode active material.

Note that the metal film is not in contact with all the negative electrode active material particles except for the case where the number of the negative electrode active material particles is small. Therefore, a binder may be used to strengthen the bond between the active material particles, or a conductive additive may be used to increase electric conductivity between the active material particles or between the active material and the current collector.

The bond between the negative electrode active material particles can be partly strengthened with the use of the metal film; consequently, the used amount of a binder can be smaller than that in the case where the metal film is not used.

In addition, to strengthen the bond between the active material particles, a plurality of graphene flakes may be formed in such a way as to wrap or coat a plurality of active material particles. Graphene is a carbon material having a crystal structure in which hexagonal skeletons of carbon are spread in a planar form and is one atomic plane extracted from graphite crystals. Due to its electrical, mechanical, or chemical characteristics which are surprisingly excellent, the graphene has been expected to be used for a variety of fields of, for example, field-effect transistors with high mobility, highly sensitive sensors, highly-efficient solar cells, and next-generation transparent conductive films and has attracted a great deal of attention. When the plurality of graphene flakes are formed, the metal film formed by sputtering strengthens the bond between graphene and the active material.

In this specification, the term "slurry" refers to suspension in which an electrode active material is suspended in a solvent, and suspension which contains not just the solvent but other additives such as a binder, a conductive additive, and graphene oxide is also referred to as "slurry".

In the case of using active material particles, a metal film formed by sputtering can inhibit the active material particles and a current collector from being separated, which makes it possible to provide a lithium-ion secondary battery with sufficient charge and discharge characteristics and long-term reliability. Furthermore, a flexible secondary battery including a flexible electrode can be provided.

BEST MODE FOR CARRYING OUT THE INVENTION

Embodiments of the present invention will be described below in detail with reference to the drawings. Note that the present invention is not limited to the description below, and it is easily understood by those skilled in the art that modes and details disclosed herein can be modified in various ways. In addition, the present invention should not be construed as being limited to the description in the following embodiments.

Embodiment 1

Description is given below of a method for forming an electrode of a lithium-ion secondary battery of one embodiment of the present invention with reference to FIGS. 1A to 1E.

Figure 1A:
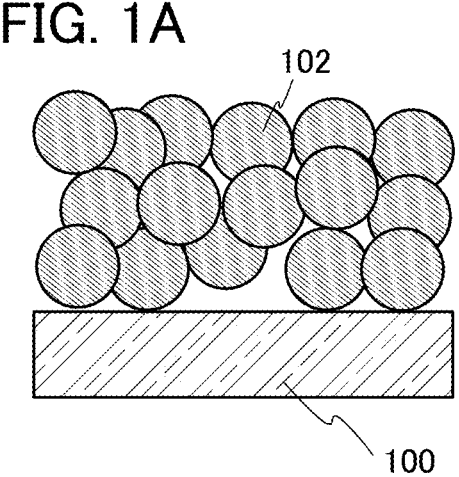
FIGS. 1A to 1E are cross-sectional views illustrating steps of one embodiment of the present invention.

First, slurry containing an electrode active material 102 is applied onto a base 100 and dried. FIG. 1A is a cross-sectional schematic view of a state in which the slurry containing the electrode active material 102 is applied onto the base 100 and dried.

In this embodiment, steps of forming a negative electrode with the use of a carbon-based material as the electrode active material 102 are described below. Note that in FIG. 1A, the electrode active material 102 is electrode active material particles made of secondary particles having an average particle diameter and a particle size distribution. For this reason, the electrode active material 102 is schematically illustrated as spheres in FIG. 1A; however, the shape of the electrode active material 102 is not limited to this shape.

Examples of the carbon-based material include graphite, graphitizing carbon (soft carbon), non-graphitizing carbon (hard carbon), a carbon nanotube, graphene, and carbon black. Examples of the graphite include artificial graphite such as meso-carbon microbeads (MCMB), coke-based artificial graphite, or pitch-based artificial graphite and natural graphite such as spherical natural graphite. In addition, the shape of the graphite is a flaky shape or a spherical shape, for example.

In this embodiment, copper foil is used as the base 100, and a mixture of MCMB and an ethyl silicate solution is used as the slurry.

A material that hardly reacts with a solvent contained in the slurry and has low adhesion to the electrode active material 102 is used for the base 100. Furthermore, material of the base 100 can be deposited by sputtering in a vacuum in the later step. As the base 100, a polyimide film, a glass substrate, and copper foil can be used. A fluororesin film or a silicon oxide film may be formed on the surface of the polyimide film, the glass substrate, or the copper foil.

If necessary, pressing may be performed after the drying.

Figure 1B:
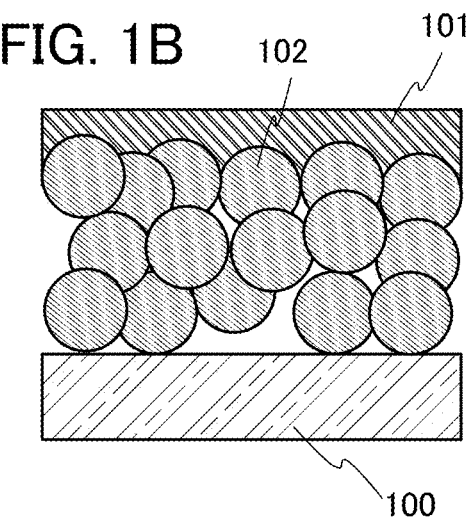

Next, as illustrated in FIG. 1B, a metal film 101 is formed over the electrode active material 102. Sputtering is used for the film formation. In this embodiment, a titanium film with a thickness of 1 μm or greater, here a 3-μm-thick titanium film, is formed as the metal film 101. In this embodiment, a substrate temperature is a room temperature, pressure is 0.3 Pa, and the flow rate of an argon gas is 7.5 sccm.

Figure 2:
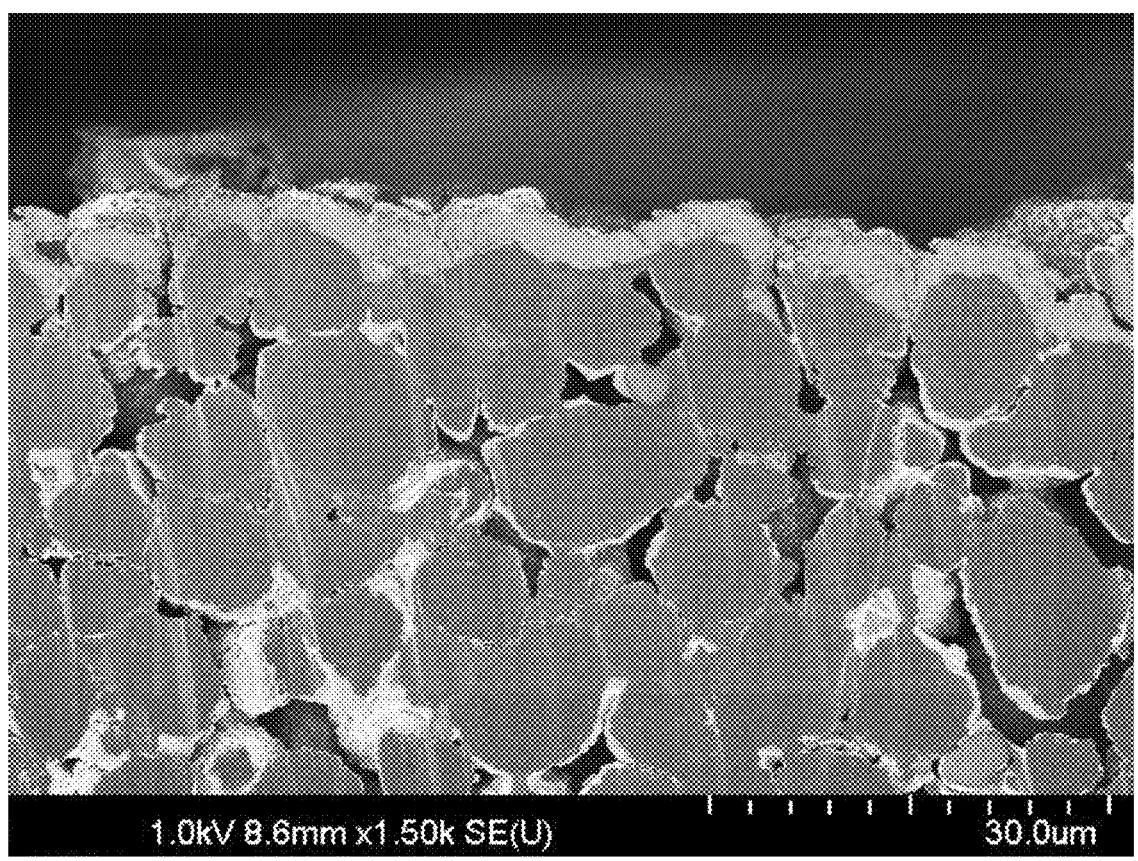
FIG. 2 is a cross-sectional SEM image of one embodiment of the present invention.

FIG. 2 is a cross-sectional scanning electron microscope (SEM) image of FIG. 1B. In FIG. 2, an interface between the metal film 101 and the electrode active material 102 is observed and part of a surface of graphite is found to be in contact with a titanium film.

Figure 1C:
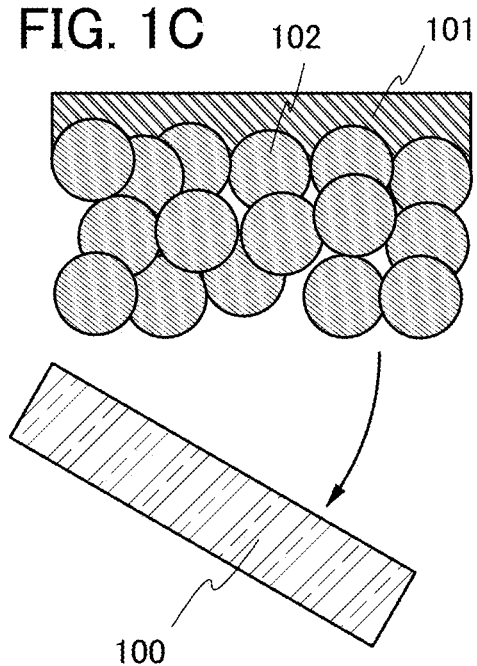

Next, as illustrated in FIG. 1C, the base 100 and the electrode active material 102 are separated at the interface therebetween. The low adhesion between the base 100 and the electrode active material 102 is preferable to the separation; however, there is no problem in separating the electrode active material 102 from the base 100 with part of the electrode active material 102 remaining on a surface of the base 100.

Figure 1D:
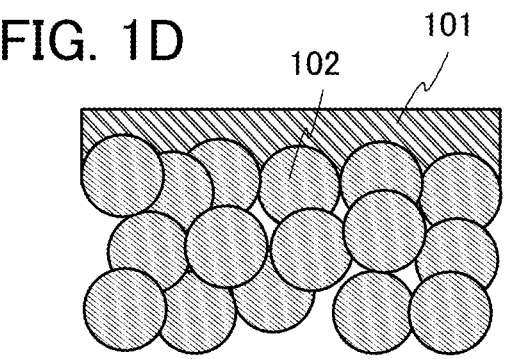

FIG. 1D illustrates the state after the separation. When the structure in FIG. 1D has enough mechanical strength, the structure can be used as the negative electrode. In this case, a film with high conductivity is used as the metal film 101 because the metal film 101 serves as a current collector.

Figure 1E:
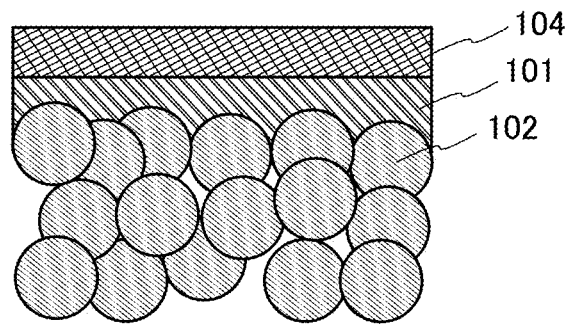

Next, as illustrated in FIG. 1E, the metal film 101 is electrically connected to a current collector 104.

Note that the current collector 104 can be formed using a highly conductive material which is not alloyed with a carrier ion such as a lithium ion, e.g., a metal typified by stainless steel, gold, platinum, zinc, iron, copper, aluminum, titanium, tantalum and an alloy thereof. Alternatively, an aluminum alloy to which an element which improves heat resistance, such as silicon, titanium, neodymium, scandium, and molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, and nickel. The current collector 104 can have, for example, a foil-like shape, a plate-like shape (sheet-like shape), a net-like shape, a cylindrical shape, a coil shape, a punching-metal shape, and an expanded-metal shape, as appropriate. The current collector 104 preferably has a thickness of greater than or equal to 10 μm and less than or equal to 30 μm.

Through the above steps, the negative electrode of the lithium-ion secondary battery can be formed.

To increase the adhesion between the current collector 104 and the electrode active material 102, the metal film 101 formed by sputtering is used as a buffer layer; thus, the lithium-ion secondary battery can have high reliability.

Embodiment 2

In this embodiment, steps of forming a positive electrode with the use of $LiFePO_4$ having an olivine crystal structure as an electrode active material particle 202 are described below. $LiFePO_4$ is particularly preferable because it properly has properties necessary for the positive electrode active material, such as safety, stability, high capacity density, high potential, and the existence of lithium ions which can be extracted in initial oxidation (charging).

For the electrode active material particle 202, a material into and from which lithium ions can be inserted and extracted can be used. For example, a lithium-containing material with an olivine crystal structure, a layered rock-salt crystal structure, and a spinel crystal structure can be used. As the positive electrode active material, a compound such as $LiFeO_2$, $LiCoO_2$, $LiNiO_2$, $LiMn_2O_4$, $V_2O_5$, $Cr_2O_5$, and $MnO_2$ can be used.

Typical examples of the lithium-containing material with an olivine crystal structure represented by a general formula, $LiMPO_4$ (M is one or more of Fe(II), Mn(II), Co(II), and Ni(II)), are $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

Examples of the lithium-containing material with a layered rock-salt crystal structure include lithium cobalt oxide ($LiCoO_2$); $LiNiO_2$; $LiMnO_2$; $Li_2MnO_3$; an NiCo-based lithium-containing material (a general formula thereof is $LiNi_xCo_{1-x}O_2$ (0<x<1)) such as or $LiNi_{0.8}Co_{0.2}O_2$; an NiMn-based lithium-containing material (a general formula thereof is $LiNi_xMn_{1-x}O_2$ (0<x<1)) such as $LiNi_{0.5}Mn_{0.5}O_2$; and an NiMnCo-based lithium-containing material (also referred to as NMC, and a general formula thereof is $LiNi_xMn_yCo_{1-x-y}O_2$ (x>0, y>0, x+y<1)) such as $LiNi_{1/3}Mn_{1/3}Co_{1/3}O_2$. Moreover, the examples further include $Li(Ni_{0.8}Co_{0.15}Al_{0.05})O_2$ and $Li_2MnO_3$-$LiMO_2$ (M=Co, Ni, or Mn).

Examples of the lithium-containing material with a spinel crystal structure include $LiMn_2O_4$, $Li_{1+x}Mn_{2-x}O_4$, $LiMn_{(2-x)}Al_xO_4$, and $LiMn_{1.5}Ni_{0.5}O_4$.

It is preferable to add a small amount of lithium nickel oxide ($LiNiO_2$ or $LiNi_{1-x}MO_2$ (M=Co, Al, for example)) to a lithium-containing material with a spinel crystal structure which contains manganese such as $LiMn_2O_4$ because advantages such as minimization of the elution of manganese and the decomposition of an electrolytic solution can be obtained.

Alternatively, a lithium-containing material represented by a general formula, $Li_{(2-j)}MSiO_4$ (M is one or more of Fe(II), Mn(II), Co(II), and Ni(II), 0≤j≤2), can be used as the positive electrode active material. Typical examples of the general formula, $Li_{(2-j)}MSiO_4$, include $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_qSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

Still alternatively, a NASICON compound represented by a general formula, $A_xM_2(XO_4)_3$ (A=Li, Na, or Mg, M=Fe, Mn, Ti, V, Nb, or Al, and X=S, P, Mo, W, As, or Si), can be used as the positive electrode active material. Examples of the NASICON compound include $Fe_2(MnO_4)_3$, $Fe_2(SO_4)_3$, and $Li_3Fe_2(PO_4)_3$. Still further alternatively, compounds represented by a general formula, $Li_2MPO_4F$, $Li_2MP_2O_7$, and $Li_5MO_4$ (M=Fe or Mn), a perovskite fluoride such as $NaFeF_3$ and $FeF_3$, a metal chalcogenide (a sulfide, a selenide, and a telluride) such as $TiS_2$ and $MoS_2$, a lithium-containing material with an inverse spinel crystal structure such as $LiMVO_4$, a vanadium oxide (e.g., $V_2O_5$, $V_6O_{13}$, and $LiV_3O_8$), a manganese oxide, and an organic sulfur compound can be used as the positive electrode active material, for example.

In the case where the carrier ions are alkali metal ions other than lithium ions or alkaline-earth metal ions, the following may be used as the positive electrode active material: a compound or a material which is obtained by substituting an alkali metal (e.g., sodium or potassium) or an alkaline-earth metal (e.g., calcium, strontium, barium, beryllium, or magnesium) for lithium in any of the above-described lithium compounds or lithium-containing materials.

In this embodiment, graphene is used as a conductive additive of the electrode. Graphene oxide with a high dispersion property is used as a raw material, and mixed and kneaded with the active material, a binder, a polar solvent (also referred to as a dispersion medium), and others. The mixture is called slurry.

Figure 3A:
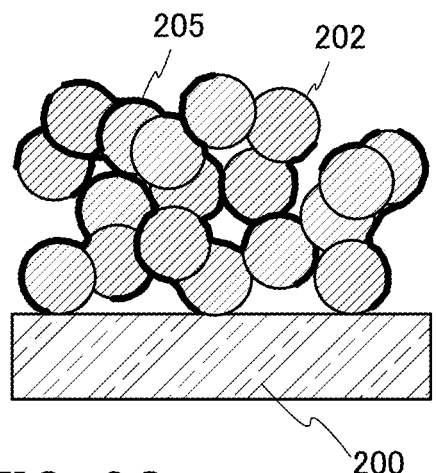
FIGS. 3A to 3D are cross-sectional views illustrating steps of one embodiment of the present invention.

First, the slurry containing the electrode active material particle 202 is applied onto a base 200 and dried. Then, the graphene oxide is reduced and dried in a reduction atmosphere. As the base 200, a polyimide film tape is used. FIG. 3A is a cross-sectional schematic view of the state in which the slurry containing the electrode active material particle 202 and the graphene oxide flakes is applied onto the base 200 and dried, the graphene oxide is reduced, and then the graphene oxide is dried in the reduction atmosphere. There is no particular limitation on a method for reducing the graphene oxide. In this embodiment, the graphene oxide is at least immersed in a reducing solution containing ascorbic acid and water. Note that the pH of the reducing solution is higher than or equal to 4 and lower than or equal to 11.

As illustrated in FIG. 3A, a network for electron conduction by graphene flake 205 is formed between the electrode active material particles 202. Consequently, an electrode for a storage battery in which graphene electrically connects the electrode active material particles to each other can be formed. In FIG. 3A, the electrode active material particles 202 are electrode active material particles made of secondary particles having an average particle diameter and a particle size distribution. For this reason, the electrode active material particles 202 are schematically illustrated as spheres in FIG. 3A; however, the shape of the electrode active material particle 202 is not limited to this shape.

Graphene oxide used as a raw material of graphene is a polar material having a functional group such as an epoxy group, a carbonyl group, a carboxyl group, or a hydroxyl group; this makes it possible to form the network. In graphene oxide in a polar solvent, oxygen in the functional group is negatively charged; hence, graphene oxide flakes do not easily aggregate but strongly interact with the polar solvent such as N-methyl-2-pyrrolidone (NMP). Thus, the functional group such as an epoxy group in the graphene oxide interacts with the polar solvent, which probably prevents aggregation among graphene oxide flakes, resulting in uniform dispersion of the graphene oxide flakes in the polar solvent.

When graphene oxide is used as a raw material of a conductive additive as described above, the graphene oxide has a high dispersion property in a polar solvent but has extremely low electric conductivity and thus does not function as the conductive additive without any change. For this reason, in forming an electrode for a storage battery, after at least an active material and graphene oxide are mixed, the graphene oxide needs to be reduced to form graphene with high electric conductivity.

Examples of a method for reducing graphene oxide are reduction treatment with heating (hereinafter referred to as thermal reduction treatment), electrochemical reduction treatment performed by application of a potential at which graphene oxide is reduced in an electrolytic solution (hereinafter referred to as electrochemical reduction), and reduction treatment using a chemical reaction caused with a reducing agent (hereinafter referred to as chemical reduction).

Figure 3B:
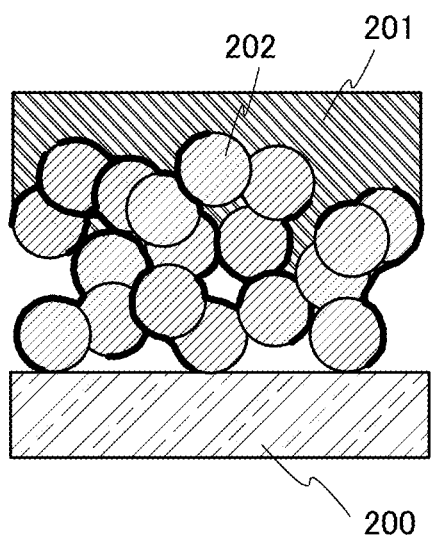

The graphene 205 is formed by reducing the graphene oxide through the electrochemical reduction or the chemical reduction and then, a metal film 201 is formed by sputtering as illustrated in FIG. 3B.

As illustrated in FIG. 3B, the metal film 201 bonds adjacent particles with each other in the electrode active material particles 202. Further, as illustrated in FIG. 3B, the metal film 201 fills at least part of a space between the electrode active material particles 202.

Figure 3C:
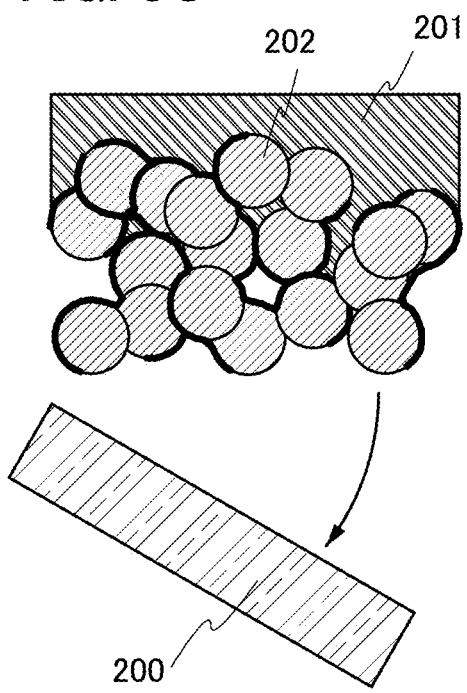

Then, as illustrated in FIG. 3C, the base 200 that is the polyimide film tape is separated from the electrode active material particles 202.

Figure 3D:
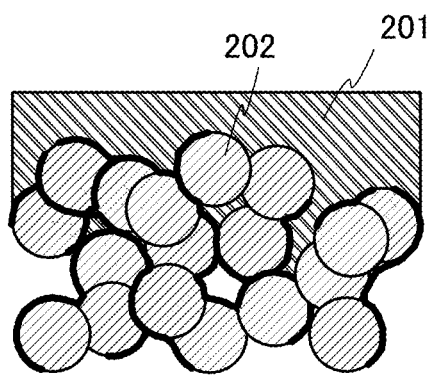

Through the above steps, a positive electrode of a lithium ion secondary battery, which is illustrated in FIG. 3D, can be formed.

The use of the metal film 201 as a current collector can reduce the thickness of the positive electrode. In addition, to increase the adhesion between the current collector and the electrode active material particle 202, the metal film 201 formed by sputtering is used as a buffer layer; thus, the lithium-ion secondary battery can have high reliability.

If necessary, a step of electrically connecting a current collector to the metal film 201 may be performed in addition to the above steps.

This embodiment can be freely combined with Embodiment 1. For example, the negative electrode obtained in Embodiment 1, the positive electrode obtained in this embodiment, a separator, and an electrolytic solution are used to fabricate a thin lithium-ion secondary battery, in which case the adhesion between the current collectors and the electrode active materials is increased to enable high reliability.

Embodiment 3

In this embodiment, an example of a method for forming an electrode of a lithium-ion secondary battery is described below. In the method, a plastic film whose surface is provided with a film containing silicon oxide is used as a base.

First, an ethyl silicate solution is applied onto a base 10a and dried, whereby a film 10b containing silicon oxide is formed on a surface of the base 10a. As the base 10a, polyethylene terephthalate (PET) is used.

Figure 4A:
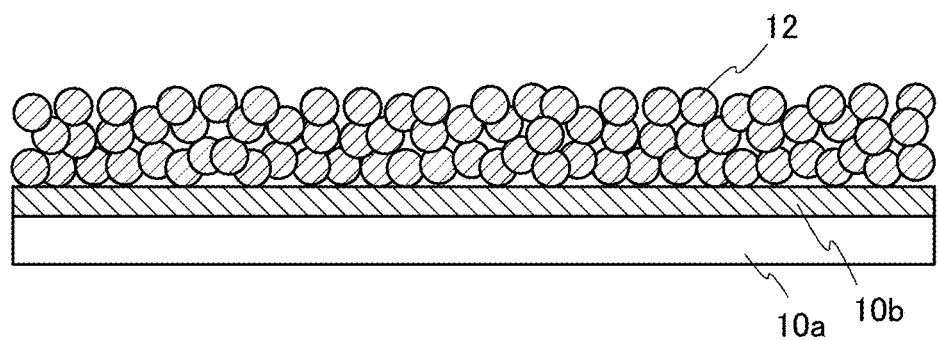
FIGS. 4A to 4C are cross-sectional views illustrating steps of one embodiment of the present invention.

Next, slurry containing an electrode active material 12 is applied and dried as illustrated in FIG. 4A. In addition to the electrode active material 12, a conductive additive, a NMP solvent, polyvinylidene fluoride, and the like are mixed in the slurry. The slurry is applied to have a predetermined thickness with the use of a coating device such as a slot die coater.

Figure 4B:
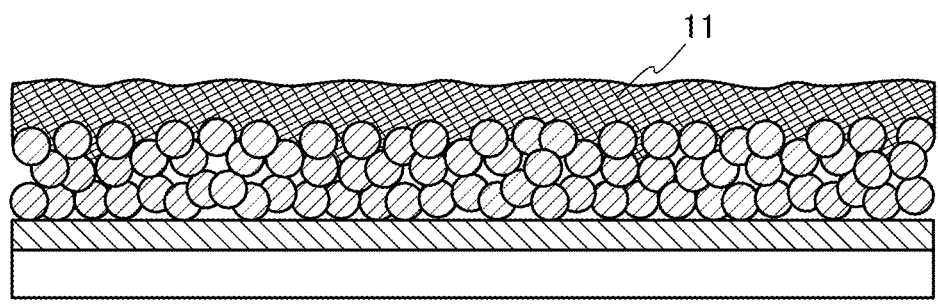

Next, a metal film 11 is formed by sputtering as illustrated in FIG. 4B. For the metal film 11, titanium or copper is used.

Next, the film 10b containing silicon oxide and the electrode active material 12 are separated at the interface therebetween.

Next, a current collector 14 whose surface is provided with a resin film 13 of, for example, polyvinylidene fluoride or styrene-butadiene rubber is formed. As the current collector 14, metal foil such as aluminum foil and copper foil is used.

Figure 4C:
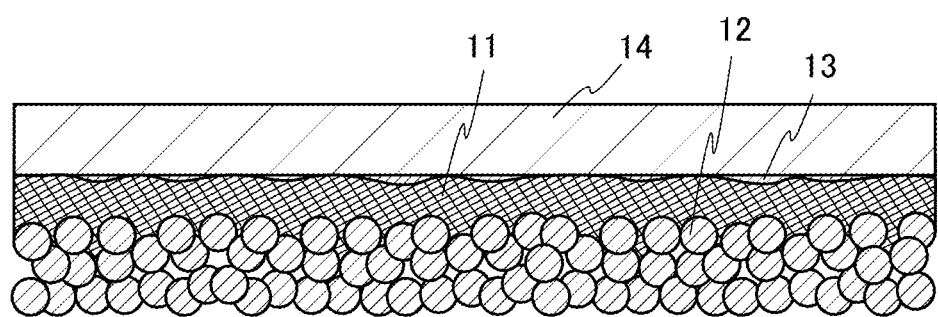

As illustrated in FIG. 4C, the current collector 14 and the metal film 11 are attached to each other with the resin film 13 as an adhesive, whereby the current collector 14 is electrically connected to the metal film 11.

Through the above steps, the electrode of the lithium-ion secondary battery can be formed.

To increase the adhesion between the current collector 14 and the electrode active material 12, the metal film 11 formed by sputtering is used as a buffer layer; thus, the lithium-ion secondary battery can have high reliability.

The above process is an example and not particularly limited. Although the current collector 14 and the metal film 11 are attached after the base 10a is separated in the above process, the base 10a may be separated after the metal film is formed and the current collector 14 is attached thereto, for example.

This embodiment can be freely combined with any of the other embodiments.

Embodiment 4

In this embodiment, examples of the structure of a storage battery using electrodes for a storage battery formed by any of the formation methods described in Embodiments 1 to 3 are described with reference to FIGS. 5A to 5C, FIG. 6, and FIGS. 7A and 7B.

(Coin-Type Storage Battery)

Figure 5A:
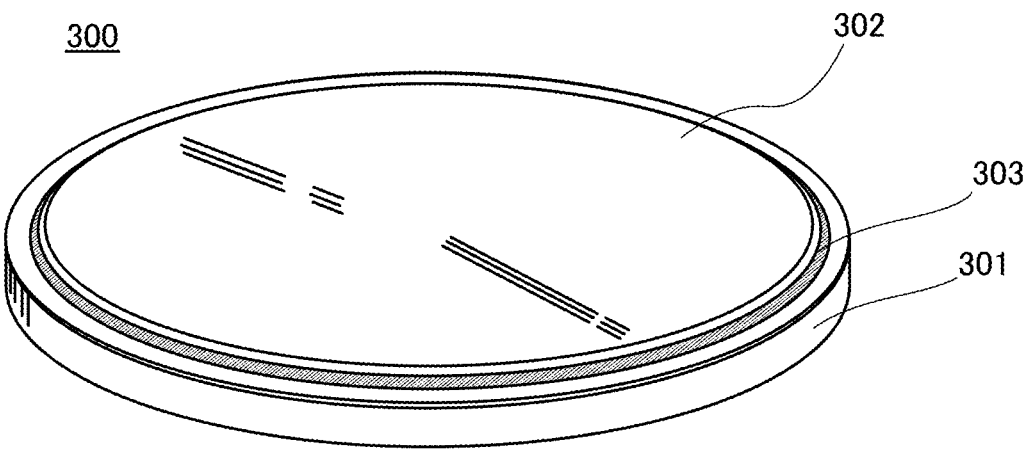
FIGS. 5A to 5C illustrate a coin-type storage battery.
Figure 5B:
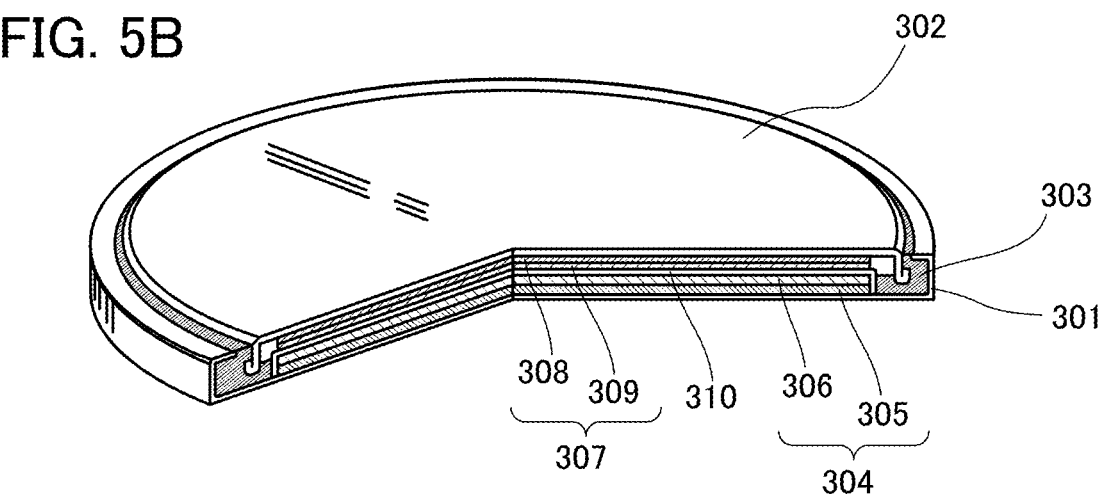

FIG. 5A is an external view of a coin-type (single-layer flat type) storage battery, and FIG. 5B is a cross-sectional view thereof.

In a coin-type storage battery 300, a positive electrode can 301 doubling as a positive electrode terminal and a negative electrode can 302 doubling as a negative electrode terminal are insulated from each other and sealed by a gasket 303 made of, for example, polypropylene. A positive electrode 304 includes a positive electrode current collector 305 and a positive electrode active material layer 306 provided in contact with the positive electrode current collector 305. A negative electrode 307 includes a negative electrode current collector 308 and a negative electrode active material layer 309 provided in contact with the negative electrode current collector 308. A separator 310 and an electrolytic solution (not illustrated) are included between the positive electrode active material layer 306 and the negative electrode active material layer 309.

As the negative electrode 307, an electrode for a storage battery formed by the method for forming an electrode for a storage battery, which is one embodiment of the present invention and is described in Embodiment 1, can be used. As the positive electrode 304, an electrode for a storage battery formed by the method for forming an electrode for a storage battery, which is one embodiment of the present invention and is described in Embodiment 2, can be used.

As the separator 310, an insulator such as cellulose (paper), polyethylene with pores, and polypropylene with pores can be used.

For an electrolyte salt of the electrolytic solution, a material containing carrier ions is used. Typical examples of the supporting electrolyte are lithium salts such as $LiPF_6$, $LiClO_4$, $LiAsF_6$, $LiBF_4$, $LiCF_3SO_3$, $Li(CF_3SO_2)_2N$, and $Li(C_2F_5SO_2)_2N$. These supporting electrolytes may each be used alone or two or more of them may be used in an appropriate combination and in an appropriate ratio.

Note that when carrier ions are alkali metal ions other than lithium ions, or alkaline-earth metal ions, instead of lithium in the above lithium salts, an alkali metal (e.g., sodium and potassium) or an alkaline-earth metal (e.g., calcium, strontium, barium, beryllium, and magnesium) may be used for the electrolyte.

For a solvent of the electrolytic solution, a material in which carrier ions can transfer is used. As the solvent of the electrolytic solution, an aprotic organic solvent is preferably used. Typical examples of the aprotic organic solvents include ethylene carbonate (EC), propylene carbonate, dimethyl carbonate, diethyl carbonate (DEC), γ-butyrolactone, acetonitrile, dimethoxyethane, and tetrahydrofuran, and one or more of these materials can be used. When a gelled high-molecular material is used as the solvent of the electrolytic solution, safety against liquid leakage and the like is improved. Further, the storage battery can be thinner and more lightweight. Typical examples of the gelled high-molecular material include a silicone gel, an acrylic gel, an acrylonitrile gel, polyethylene oxide, polypropylene oxide, and a fluorine-based polymer. Alternatively, the use of one or more of ionic liquids (room temperature molten salts) which have features of non-flammability and non-volatility as the solvent of the electrolytic solution can prevent the storage battery from exploding or catching fire even when the storage battery internally shorts out or the internal temperature increases owing to, for example, overcharging.

Instead of the electrolytic solution, a solid electrolyte containing an inorganic material such as a sulfide-based inorganic material or an oxide-based inorganic material, or a solid electrolyte containing a high-molecular material such as a polyethylene oxide (PEO)-based high-molecular material may alternatively be used as the electrolyte. In the case of using the solid electrolyte, a separator or a spacer is not necessary. Further, the battery can be entirely solidified; therefore, there is no possibility of liquid leakage and thus the safety of the battery is dramatically increased.

For the positive electrode can 301 and the negative electrode can 302, a metal having corrosion resistance to an electrolytic solution, such as nickel, aluminum, and titanium, an alloy of such a metal, and an alloy of such a metal and another metal (e.g., stainless steel) can be used. Alternatively, the positive electrode can 301 and the negative electrode can 302 are preferably coated with, for example, nickel or aluminum in order to prevent corrosion caused by the electrolytic solution. The positive electrode can 301 and the negative electrode can 302 are electrically connected to the positive electrode 304 and the negative electrode 307, respectively.

The negative electrode 307, the positive electrode 304, and the separator 310 are immersed in the electrolytic solution. Then, as illustrated in FIG. 5B, the positive electrode can 301, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 interposed therebetween. In such a manner, the coin-type storage battery 300 is fabricated.

Here, a current flow in charging a battery is described with reference to FIG. 5C. When a battery using lithium is regarded as a closed circuit, lithium ions move and a current flows in the same direction. Note that in the battery using lithium, an anode and a cathode change places in charge and discharge, and an oxidation reaction and a reduction reaction occur on the corresponding sides; hence, an electrode with a high redox potential is called a positive electrode and an electrode with a low redox potential is called a negative electrode. For this reason, in this specification, the positive electrode is referred to as a "positive electrode" and the negative electrode is referred to as a "negative electrode" in all the cases where charge is performed, discharge is performed, a reverse pulse current is supplied, and a charging current is supplied. The use of the terms "anode" and "cathode" related to an oxidation reaction and a reduction reaction might cause confusion because the anode and the cathode change places at the time of charging and discharging. Thus, the terms "anode" and "cathode" are not used in this specification. If the terms "anode" or "cathode" is used, whether it is at the time of charging or discharging is noted and whether it corresponds to a positive electrode or a negative electrode is also noted.

Figure 5C:
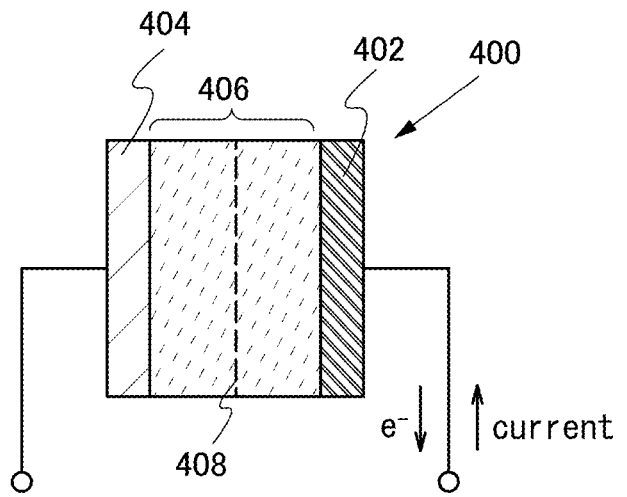

Two terminals in FIG. 5C are connected to a charger, and a storage battery 400 is charged. As the charge of the storage battery 400 proceeds, a potential difference between electrodes increases. The positive direction in FIG. 5C is the direction in which a current flows from the one terminal outside the storage battery 400 to a positive electrode 402, flows from the positive electrode 402 to a negative electrode 404 in the storage battery 400, and flows from the negative electrode 404 to the other terminal outside the storage battery 400. In other words, a current flows in the direction of a flow of a charging current.

(Laminated Storage Battery)

Next, an example of a laminated storage battery is described with reference to FIG. 6.

Figure 6:
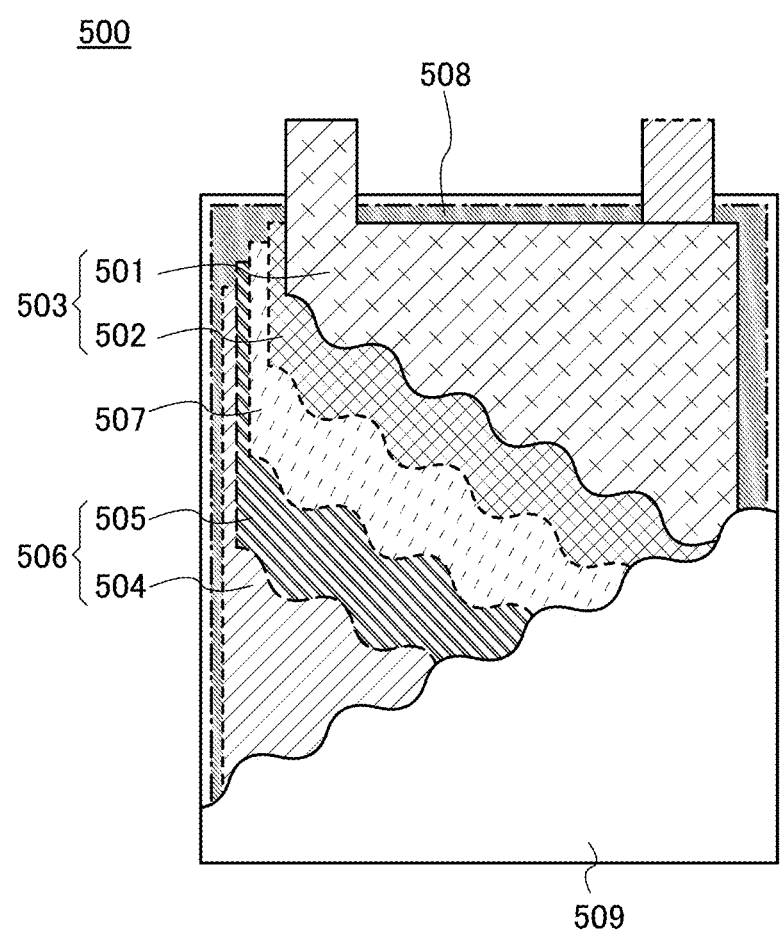
FIG. 6 illustrates a laminated storage battery.

A laminated battery cell 500 illustrated in FIG. 6 includes a positive electrode 503 including a positive electrode current collector 501 and a positive electrode active material layer 502, a negative electrode 506 including a negative electrode current collector 504 and a negative electrode active material layer 505, a separator 507, an electrolytic solution 508, and an exterior body 509. The separator 507 is provided between the positive electrode 503 and the negative electrode 506 in the exterior body 509. The exterior body 509 is filled with the electrolytic solution 508. Furthermore, a flexible secondary battery including a flexible electrode can be provided.

In the laminated storage battery 500 illustrated in FIG. 6, the positive electrode current collector 501 and the negative electrode current collector 504 also function as terminals for electrical contact with an external portion. For this reason, each of the positive electrode current collector 501 and the negative electrode current collector 504 is arranged so that part of the positive electrode current collector 501 and part of the negative electrode current collector 504 are exposed outside the exterior body 509.

As the exterior body 509 in the laminated storage battery 500, a laminate film having a three-layer structure can be used, for example. In the three-layer structure, a highly flexible metal thin film of, for example, aluminum, stainless steel, copper, and nickel is provided over a film formed of a material such as polyethylene, polypropylene, polycarbonate, ionomer, and polyamide, and an insulating synthetic resin film of, for example, a polyamide-based resin and a polyester-based resin is provided as the outer surface of the exterior body over the metal thin film. With such a three-layer structure, permeation of an electrolytic solution and a gas can be blocked and an insulating property and resistance to the electrolytic solution can be provided.

(Cylindrical Storage Battery)

Figure 7A:
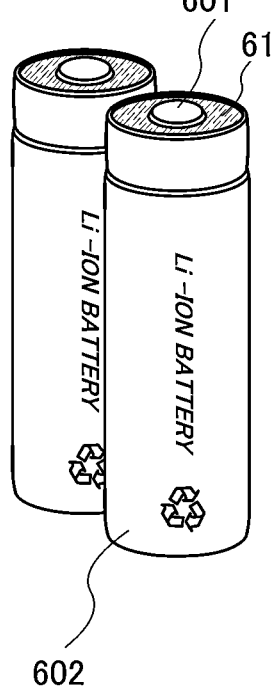
FIGS. 7A and 7B illustrate a cylindrical storage battery.

Next, an example of a cylindrical storage battery is described with reference to FIGS. 7A and 7B. As illustrated in FIG. 7A, a cylindrical secondary battery 600 includes a positive electrode cap (battery cap) 601 on its top surface and a battery can (outer can) 602 on its side surface and bottom surface. The positive electrode cap 601 and the battery can 602 are insulated from each other with a gasket (insulating packing) 610.

Figure 7B:
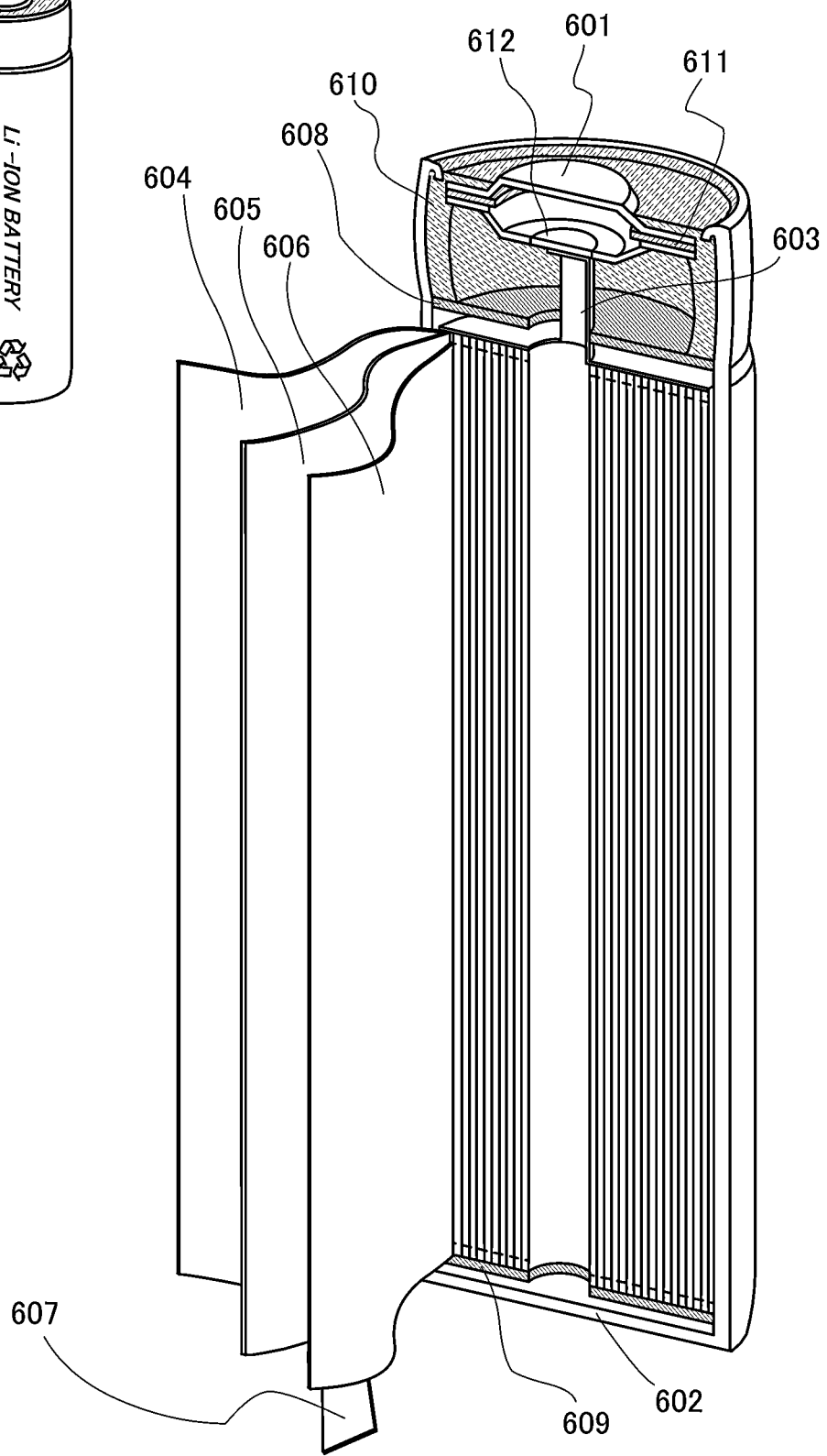

FIG. 7B is a schematic view of a cross-section of the cylindrical storage battery. Inside the battery can 602 having a hollow cylindrical shape, a battery element in which a strip-like positive electrode 604 and a strip-like negative electrode 606 are wound with a separator 605 positioned therebetween is provided. Although not illustrated, the battery element is wound around a center pin. One end of the battery can 602 is close and the other end thereof is open. For the battery can 602, a metal having corrosion resistance to an electrolytic solution, such as nickel, aluminum, or titanium, an alloy of such a metal, or an alloy of such a metal and another metal (e.g., stainless steel or the like) can be used. Alternatively, the battery can 602 is preferably covered with nickel, aluminum, or the like in order to prevent corrosion caused by the electrolytic solution. Inside the battery can 602, the battery element in which the positive electrode, the negative electrode, and the separator are wound is positioned between a pair of insulating plates 608 and 609 which face each other. Further, a nonaqueous electrolytic solution (not illustrated) is injected inside the battery can 602 provided with the battery element. As the nonaqueous electrolytic solution, a nonaqueous electrolytic solution which is similar to those of the above coin-type storage battery and the laminated power storage device can be used.

The positive electrode 604 and the negative electrode 606 can be formed in a manner similar to that of the positive electrode and the negative electrode of the coin-type storage battery described above; however, the difference lies in that, active material layers are formed on both sides of a current collector in each electrode because the positive electrode and the negative electrode of the cylindrical storage battery are wound. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a positive temperature coefficient (PTC) element 611. The safety valve mechanism 612 cuts off electrical connection between the positive electrode cap 601 and the positive electrode 604 when the internal pressure of the battery exceeds a predetermined threshold value. The PTC element 611 is a heat sensitive resistor whose resistance increases as temperature rises, and controls the amount of current by increase in resistance to prevent abnormal heat generation. Note that barium titanate ($BaTiO_3$)-based semiconductor ceramic or the like can be used for the PTC element.

Note that in this embodiment, the coin-type storage battery, the laminated storage battery, and the cylindrical storage battery are given as examples of the storage battery; however, any of storage batteries with a variety of shapes, such as a sealed storage battery and a rectangular storage battery, can be used. Further, a structure in which a plurality of positive electrodes, a plurality of negative electrodes, and a plurality of separators are stacked or rolled may be employed.

As the positive electrodes and the negative electrodes of the storage battery 300, the storage battery 500, and the storage battery 600, which are described in this embodiment, electrodes formed by the method for forming an electrode for a storage battery which is one embodiment of the present invention are used. Thus, the discharge capacity of the storage batteries 300, 500, and 600 can be increased.

This embodiment can be freely combined with any of the other embodiments.

Embodiment 5

In this embodiment, examples of electronic devices including any of the storage batteries illustrated in the above embodiments are described with reference to FIGS. 8A and 8B and FIGS. 9A and 9B.

Figure 8A:
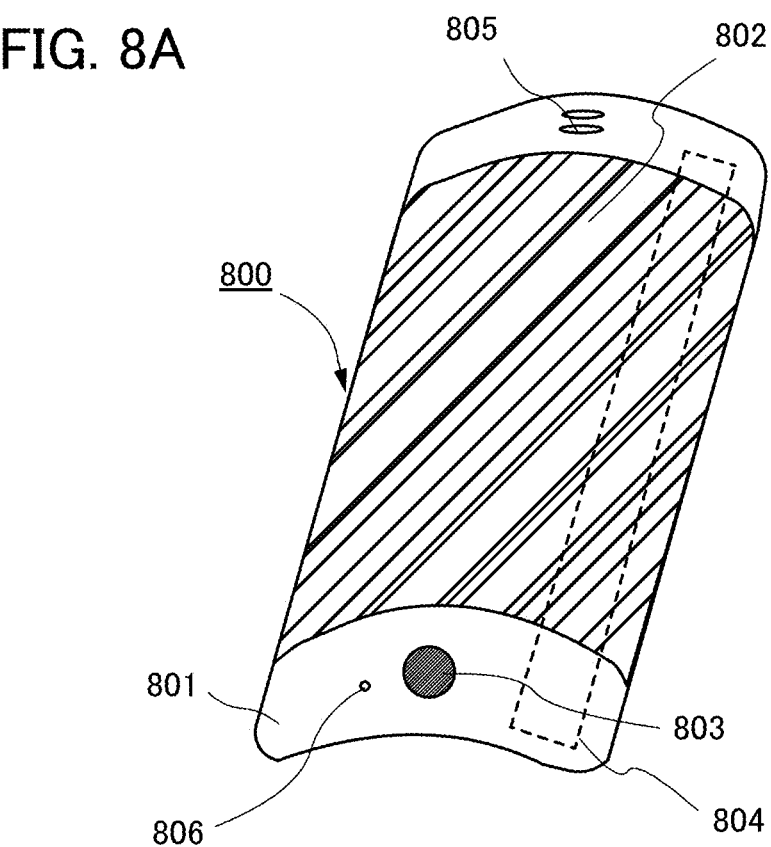
FIGS. 8A and 8B illustrate electronic devices.
Figure 8B:
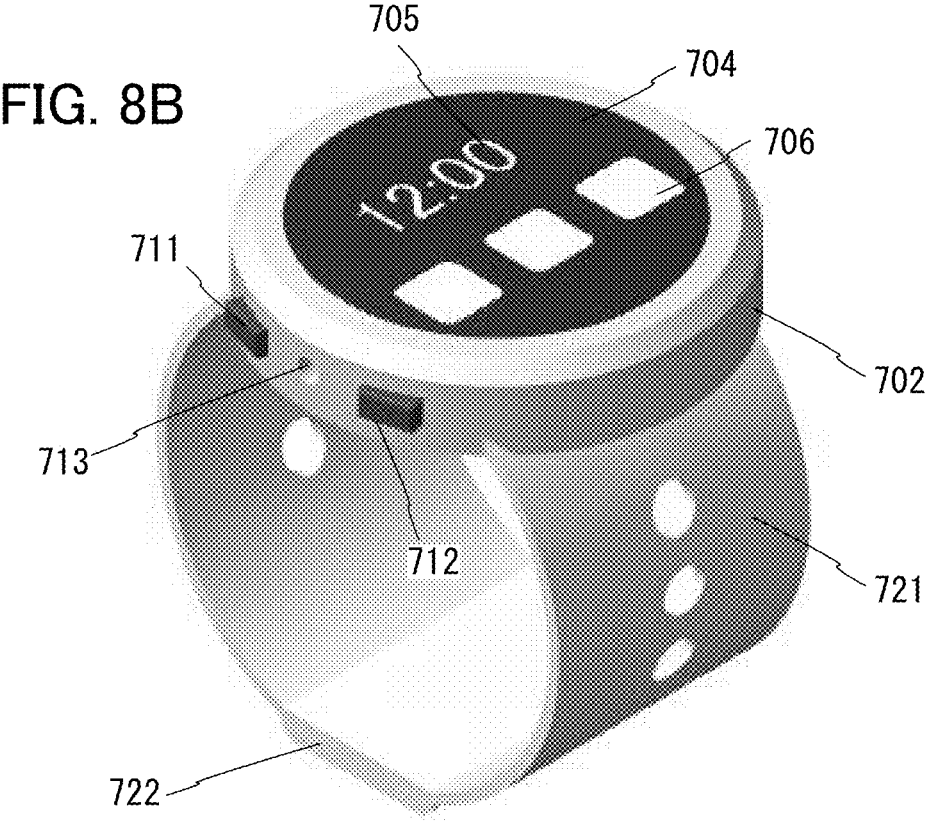

Examples of electronic devices including storage batteries are cameras such as digital cameras and digital video cameras, digital photo frames, mobile phones (also referred to as cellular phones or portable telephone devices), portable game consoles, portable information terminals, and audio reproducing devices. FIGS. 8A and 8B illustrate specific examples of these electronic devices.

FIG. 8A illustrates an example of a mobile phone. A mobile phone 800 is provided with a display portion 802 incorporated in a housing 801, an operation button 803, a speaker 805, a microphone 806, and the like. The use of a storage battery 804 of one embodiment of the present invention in the mobile phone 800 results in weight reduction.

When the display portion 802 of the mobile phone 800 illustrated in FIG. 8A is touched with a finger or the like, data can be input into the mobile phone 800. Users can make a call or text messaging by touching the display portion 802 with their fingers or the like.

There are mainly three screen modes for the display portion 802. The first mode is a display mode mainly for displaying an image. The second mode is an input mode mainly for inputting data such as characters. The third mode is a display-and-input mode in which two modes of the display mode and the input mode are combined.

For example, in the case of making a call or composing an e-mail, a text input mode mainly for inputting text is selected for the display portion 802 so that text displayed on a screen can be inputted.

When a sensing device including a sensor such as a gyroscope and an acceleration sensor for detecting inclination is provided in the mobile phone 800, display on the screen of the display portion 802 can be automatically changed in direction by determining the orientation of the mobile phone 800 (whether the mobile phone 800 is placed horizontally or vertically for a landscape mode or a portrait mode).

The screen modes are switched by touching the display portion 802 or operating the operation button 803 of the housing 801. Alternatively, the screen modes may be switched depending on the kind of the image displayed on the display portion 802. For example, when a signal of an image displayed on the display portion is a signal of moving image data, the screen mode is switched to the display mode. When the signal is a signal of text data, the screen mode is switched to the input mode.

Moreover, in the input mode, if a signal detected by an optical sensor in the display portion 802 is detected and the input by touch on the display portion 802 is not performed for a certain period, the screen mode may be controlled so as to be changed from the input mode to the display mode.

The display portion 802 can function as an image sensor. For example, an image of a palm print, a fingerprint, or the like is taken with the display portion 802 touched with the palm or the finger, whereby personal authentication can be performed. Further, by providing a backlight or a sensing light source which emits a near-infrared light in the display portion, an image of a finger vein, a palm vein, and the like can be taken.

FIG. 8B illustrates a smart watch. The smart watch can include a housing 702, a display panel 704, operation buttons 711 and 712, a connection terminal 713, a band 721, a clasp 722, and so on. The use of the storage battery of one embodiment of the present invention in the smart watch results in weight reduction.

The display panel 704 mounted in the housing 702 serving as a bezel includes a non-rectangular display region. The display panel 704 can display an icon 705 indicating time and another icon 706.

The smart watch in FIG. 8B can have a variety of functions, for example, a function of displaying a variety of information (e.g., a still image, a moving image, and a text image) on a display portion, a touch panel function, a function of displaying a calendar, date, time, and the like, a function of controlling processing with a variety of software (programs), a wireless communication function, a function of being connected to a variety of computer networks with a wireless communication function, a function of transmitting and receiving a variety of data with a wireless communication function, and a function of reading program or data stored in a recording medium and displaying the program or data on a display portion.

The housing 702 can include a speaker, a sensor (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays), a microphone, and so on.

Figure 9A:
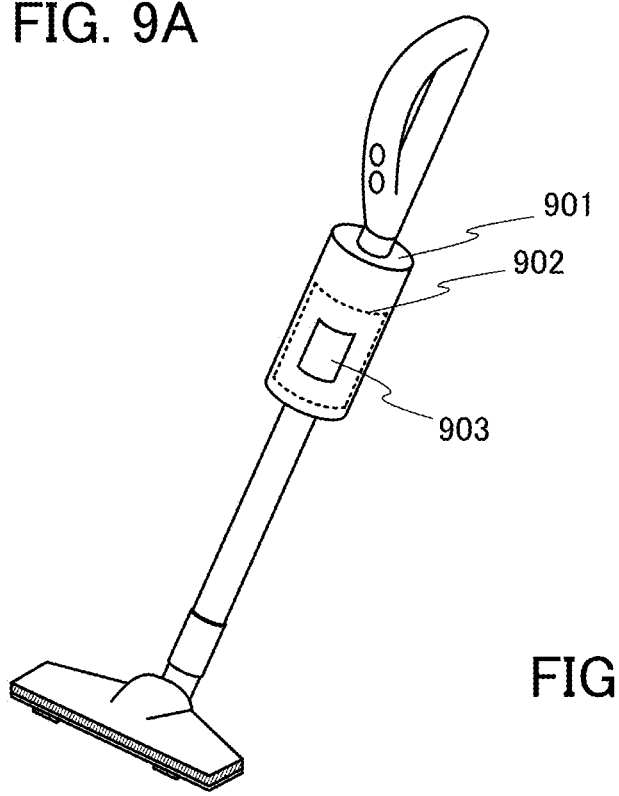
FIGS. 9A and 9B illustrate an electronic device.
Figure 9B:
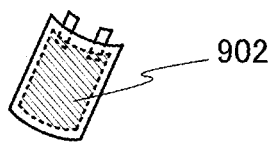
Figure 10A:
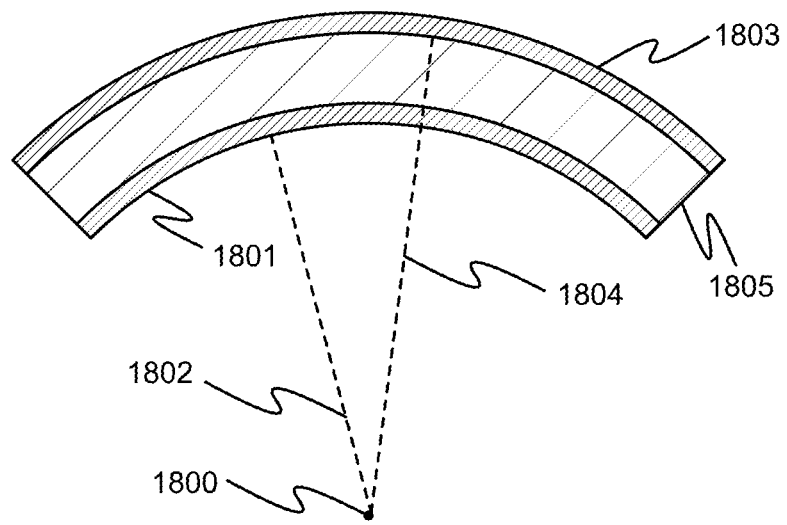
FIGS. 10A to 10D illustrate a center of curvature.
Figure 10B:
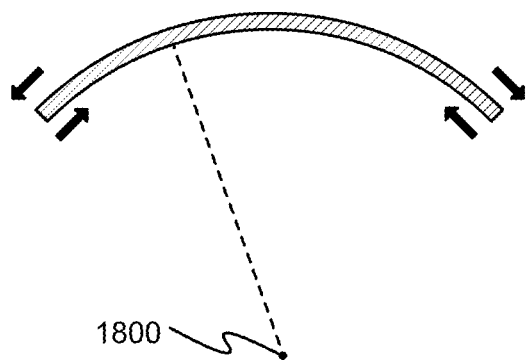
Figure 10C:
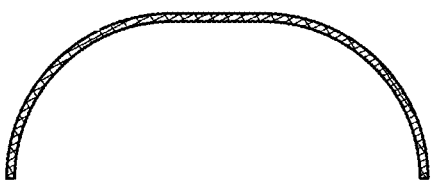
Figure 10D:
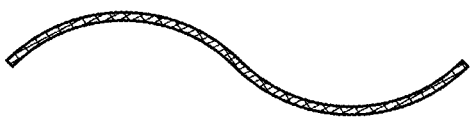
Figure 11A:
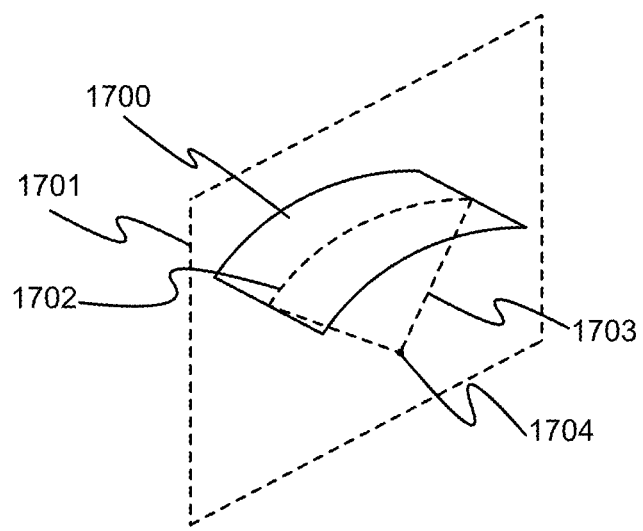
FIGS. 11A to 11C illustrate a radius of curvature of a surface.
Figure 11B:
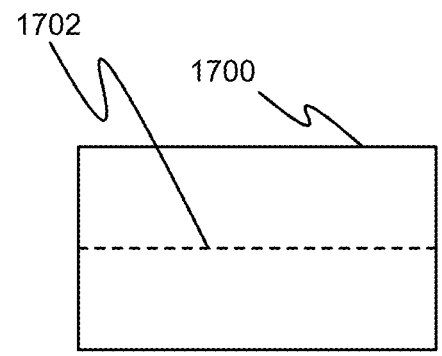
Figure 11C:
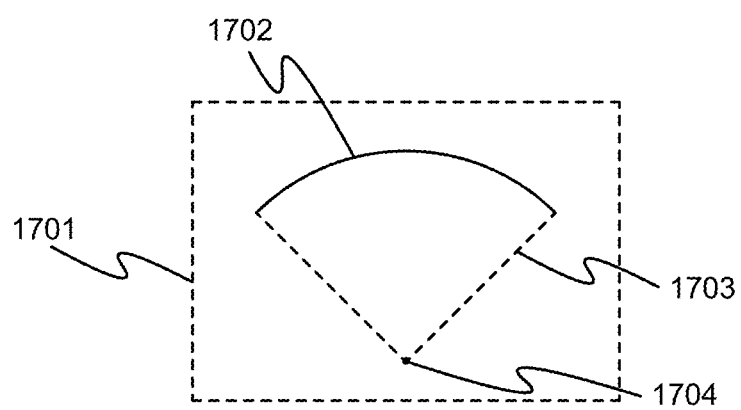

A vacuum cleaner 901 illustrated in FIG. 9A includes a thin secondary battery 902 which is curved. The thin secondary battery is illustrated in FIG. 9B. In the vacuum cleaner 901, a space for collecting dust is preferably as large as possible. For this reason, it is effective to use the thin secondary battery 902 which is curved to fit the shape of an outer surface of the vacuum cleaner.

The thin secondary battery 902 can be fabricated by a method for fabricating the laminated storage battery described in Embodiment 4 with the use of any of the electrodes for a storage battery described in Embodiments 1 to 3.

The thin secondary battery 902 is a laminated secondary battery and fixed to be curved. The vacuum cleaner 901 includes a display portion 903 that displays, for example, the remaining amount of power in the thin secondary battery 902. A display area of the display portion 903 is curved to fit the shape of the outer surface of the vacuum cleaner. The vacuum cleaner includes a power cord. When the thin secondary battery 902 is charged to have sufficient power, the power cord can be removed from the receptacle to use the vacuum cleaner. The thin secondary battery 902 may be charged wirelessly without using the power cord.

Note that the structure and the like described in this embodiment can be used as appropriate in combination with any of the structures and the like in the other embodiments.

EXPLANATION OF REFERENCE

10a: base, 10b: film, 11: metal film, 12: electrode active material, 13: resin film, 14: current collector, 100: base, 101: metal film, 102: electrode active material, 104: current collector, 200: base, 201: metal film, 202: electrode active material particle, 205: graphene, 300: storage battery, 301: positive electrode can, 302: negative electrode can, 303: gasket, 304: positive electrode, 305: positive electrode current collector, 306: positive electrode active material layer, 307: negative electrode, 308: negative electrode current collector, 309: negative electrode active material layer, 310: separator, 400: storage battery, 402: positive electrode, 404: negative electrode, 500: storage battery, 501: positive electrode current collector, 502: positive electrode active material layer, 503: positive electrode, 504: negative electrode current collector, 505: negative electrode active material layer, 506: negative electrode, 507: separator, 508: electrolytic solution, 509: exterior body, 600: storage battery, 601: positive electrode cap, 602: battery can, 603: positive electrode terminal, 604: positive electrode, 605: separator, 606: negative electrode, 607: negative electrode terminal, 608: insulating plate, 609: insulating plate, 611: PTC element, 612: safety valve mechanism, 702: housing, 704: display panel, 705: icon, 706: icon, 711: operation button, 712: operation button, 713: connection terminal, 721: band, 722:

clasp, 800: mobile phone, 801: housing, 802: display portion, 803: operation button, 804: storage battery, 805: speaker, 806: microphone, 901: vacuum cleaner, 902: secondary battery, 903: display portion, 1700: curved surface, 1701: plane surface, 1702: curve, 1703: radius of curvature, 1704: center of curvature, 1800: center of curvature, 1801: film, 1802: radius of curvature, 1803: film, 1804: radius of curvature, and 1805: component including electrodes and an electrolytic solution.

This application is based on Japanese Patent Application serial no. 2013-088165 filed with Japan Patent Office on Apr. 19, 2013, the entire contents of which are hereby incorporated by reference.

What is claimed is:

1. A method for forming an electrode, comprising the steps of:
 applying an ethyl silicate solution on a base;
 drying the ethyl silicate solution on the base to form a film comprising silicon oxide;
 forming an active material layer over the film comprising silicon oxide;
 forming a metal film comprising one of titanium and nickel over and in contact with the active material layer; and
 separating the base from the active material layer after forming the metal film, and
 attaching a current collector to the metal film with an adhesive after separating the base,
 wherein the active material layer comprises a graphite particle,
 wherein the adhesive comprises an insulating resin, and
 wherein the graphite particle is covered with a silicon oxide film.

2. The method for forming an electrode according to claim 1, wherein the current collector is electrically connected to the metal film and the active material layer by the attaching step.

3. The method for forming an electrode according to claim 1, wherein the adhesive includes a plurality of island-shaped regions.

4. The method for forming an electrode according to claim 1, wherein the metal film is formed by a sputtering method.

5. The method for forming an electrode according to claim 1, wherein the metal film comprises titanium.

6. The method for forming an electrode according to claim 1, wherein the active material layer comprises active material particles.

7. The method for forming an electrode according to claim 6, wherein the active material particles each comprise graphite.

8. The method for forming an electrode according to claim 1, wherein the base comprises a plastic film.

9. The method for forming an electrode according to claim 1, wherein the silicon oxide film forms a silicide with the metal film.

* * * * *